United States Patent [19]

Nepveu de Villemarceau et al.

[11] Patent Number: 4,941,112
[45] Date of Patent: Jul. 10, 1990

[54] METHOD AND DEVICE TO MEASURE THE LITHIUM CONCENTRATION IN THE PRIMARY COOLING CIRCUIT OF A NUCLEAR REACTOR

[75] Inventors: Christian Nepveu de Villemarceau, Dammarie Les Lys; Jean-Luc Pereira, Chauny; Jean-Pierre Blin, Dammarie Les Lys; Anne-Marie Arzel, Le Mee Sur Seine; Didier Livigni, Chatillon sur Loire, all of France

[73] Assignee: Electricite de France (National Service), Paris, France

[21] Appl. No.: 201,045

[22] Filed: May 31, 1988

[30] Foreign Application Priority Data

Jun. 2, 1987 [FR] France ............................ 87 07690

[51] Int. Cl.[5] ...................... G06F 15/20; G05D 21/02
[52] U.S. Cl. ........................... 364/527; 364/502; 364/550; 364/496; 364/498; 376/306; 376/277
[58] Field of Search ........... 364/498, 527, 550, 551.01, 364/496, 499, 500, 502; 376/306, 313, 277; 137/4, 5; 73/23

[56] References Cited

U.S. PATENT DOCUMENTS

| | | |
|---|---|---|
| 1,450,023 | 3/1923 | Edelman .................................. 137/5 |
| 4,332,031 | 5/1982 | Barratt et al. ......................... 376/313 |
| 4,364,900 | 12/1982 | Burrill ..................................... 376/306 |
| 4,698,198 | 10/1987 | Gruen ..................................... 376/306 |

FOREIGN PATENT DOCUMENTS

| | | |
|---|---|---|
| 0094884 | 11/1983 | European Pat. Off. . |
| 0161844 | 11/1985 | European Pat. Off. . |
| 0220666 | 5/1987 | European Pat. Off. . |
| 3515051 | 5/1984 | Fed. Rep. of Germany . |
| 0206600 | 10/1985 | Japan ..................................... 364/527 |
| 2094033 | 9/1982 | United Kingdom ..................... 137/4 |

OTHER PUBLICATIONS

*Journal of British Nuclear Energy Society*, Apr. 26, 1987, No. 2, London, Great Britain Conference Report.

Primary Examiner—Parshotam S. Lall
Assistant Examiner—E. B. Ramirez

[57] ABSTRACT

A method and a device are disclosed for measuring the lithium concentration in the primary cooling circuit of a nuclear power station reactor. The lithium concentration $Li^+$ is determined by linear correlation between the electrical conductivity $\lambda$ of the cooling water measured by measuring means 1, at a given temperature t measured by measuring means 2. Means 4 to measure the boron concentration B make it possible, by means of the computing means 3 to determine the lithium concentration $Li^+$ according to the decreasing lithium hydroxide specification. The invention can be applied to the maintaining and regulation of the pH of the cooling water of a nuclear power station reactor at a determined value.

14 Claims, 3 Drawing Sheets

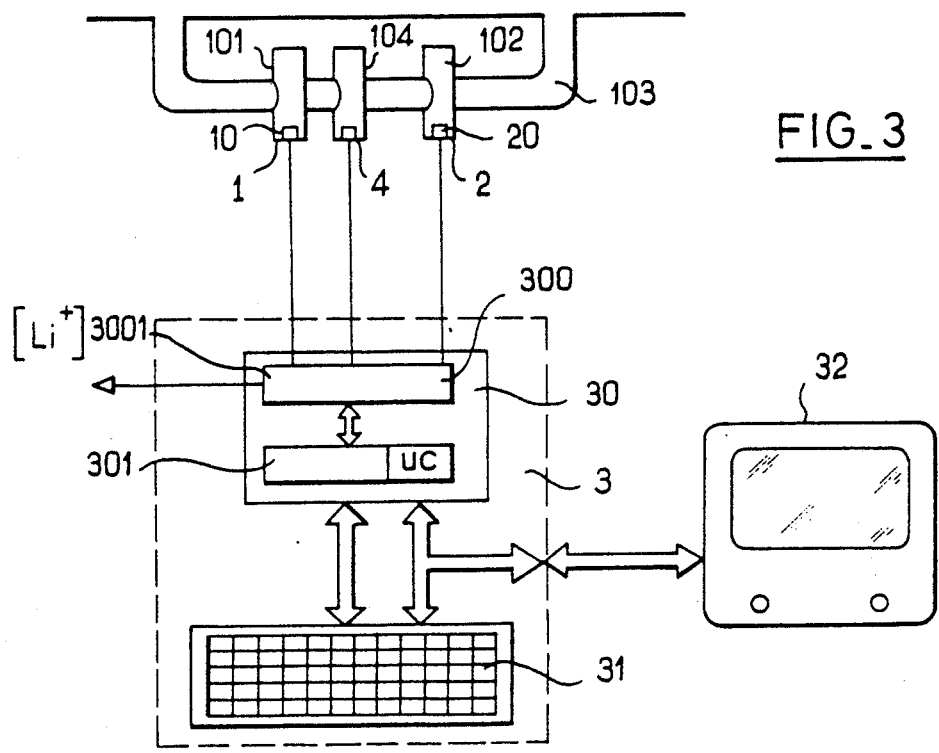
FIG_3
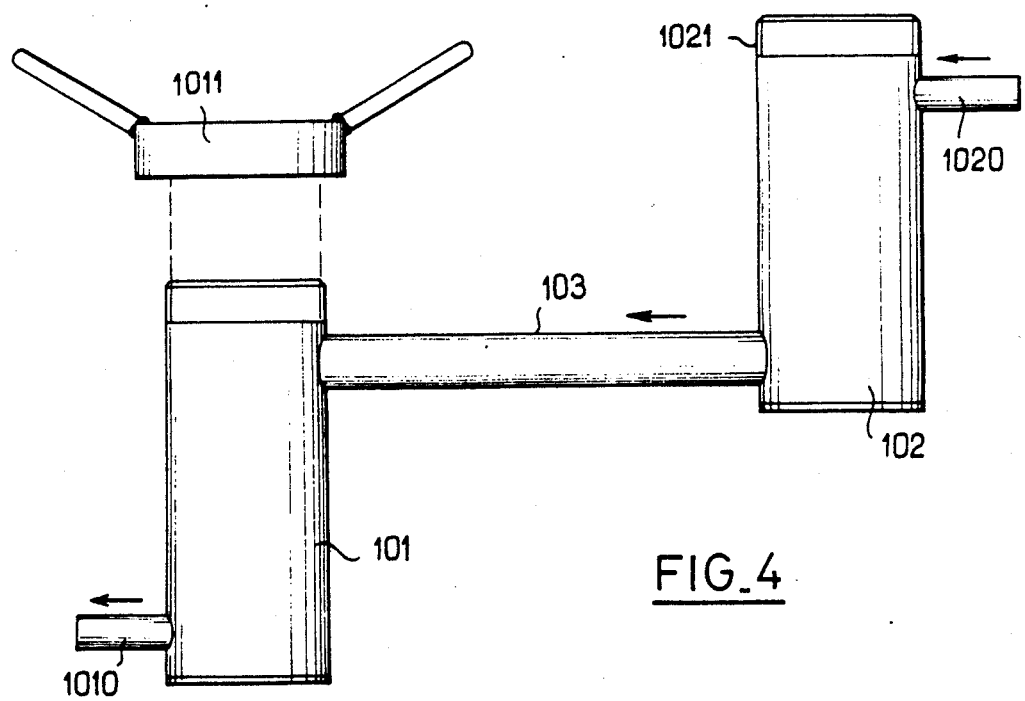
FIG_4

METHOD AND DEVICE TO MEASURE THE LITHIUM CONCENTRATION IN THE PRIMARY COOLING CIRCUIT OF A NUCLEAR REACTOR

BACKGROUND OF THE INVENTION

1. Field of the Invention

The present invention relates to a method and device to measure the lithium concentration in the primary cooling circuit of a pressurized water reactor of a nuclear power station.

2. Description of the Prior Art

In the cooling water of a reactor of nuclear power station of the pressurized-water reactor type, boron must be introduced in the form of boric acid, in order to regulate the flow of neutrons. This cooling circuit is called the primary circuit.

During a production cycle, i.e. during the operation of the reactor between two fuel reloadings, the boron concentration varies from about 2,000 ppm or parts per million to almost zero ppm.

In the cooling circuit, the corrosion products become radioactive after they have travelled through the reactor core. These products are partly responsible for the radiation undergone by operating and maintenance staff in nuclear power stations.

Studies conducted, using the PACTOLE computation code drawn up by the French Atomic Energy Commission (*Commissariat l'Energie Atomique*) have shown that, by maintaining a constant pH in the water of the primary circuit, it is possible to substantially reduce the quantity of these radioactive products and, consequently, the intensity of the radioactive radiation and the dose absorbed by maintenance staff. To this end, it is therefore advantageous to neutralize the boric acid partially by injecting a base, such as lithium hydroxide (LioH) into the cooling primary circuit.

Thus, FIG. 1 shows the relationship governing the variation of the lithium hydroxide and boron concentration in the primary cooling circuit to keep a constant pH during a production cycle.

In order to comply with the relationship governing the variation of the lithium hydroxide concentration, as shown in FIG. 1, a variation relationship known as the decreasing lithium hydroxide specification, the lithium concentration in the primary cooling circuit has to be measured. For this purpose, a sample of cooling water is taken and the lithium concentration is measured by atomic absorption spectrometry. If the lithium hydroxide concentration is not satisfactory, it must be adjusted in the circuit and another measurement must be made to ascertain that the new concentration measured corresponds the above-mentioned decreasing lithium hydroxide specification. All the above-mentioned operations require lengthy stages for their application and, moreover, the adjusting of the lithium hydroxide concentration is not easy to do during the measurement inasmuch as even if the quantitative proportioning of lithium hydroxide is achieved with sufficient precision, it can hardly be ensured in any valid way without taking into account the response time of the entire primary cooling circuit to reach the desired pH value.

SUMMARY OF THE INVENTION

The method and device according to the invention are aimed at removing the above-mentioned drawbacks by the application of a method and a device for the continuous measurement of the lithium concentration in the cooling water of the primary circuits of pressurized-water nuclear power plants.

Another object of the method and device according to the invention is the establishment, through the application of the method and device according to the invention, of a process to regulate the pH of the cooling water to enable optimizing the response time of the primary cooling circuit to obtain the desired pH value of the cooling water.

Finally, another object of the method and device according to the invention is a totally automated application of a method for regulating the lithium concentration and, hence, the pH of the cooling water in the primary circuits of pressurized-water nuclear power stations.

A distinguishing feature of the device, according to th invention, for measuring the lithium concentration in the primary cooling circuit of the pressurized water reactor of a nuclear power station is that it consists in measuring the electrical conductivity of the cooling water of the primary circuit from a sample of this water, and then in determining the lithium concentration by linear correlation between the electrical conductivity of the cooling water and this concentration.

Another distinguishing feature of the device, according to the invention, for measuring the lithium concentration in the primary cooling circuit of the pressurized-water reactor of a nuclear power station is that it comprises means to measure the electrical conductivity of the cooling water of the primary circuit and means to compute the lithium concentration according to the method of the invention.

The method and device of the invention can be applied in an especially advantageous way to the continuous, automated regulation of the pH of the cooling water of the pressurized-water primary cooling circuit of nuclear power stations.

BRIEF DESCRIPTION OF THE DRAWINGS

The method and device according to the invention will be better understood from the following description and drawings. Apart from FIG. 1 relating to the relationship governing the variation of the lithium hydroxide concentration in the primary cooling circuit during a production cycle of the reactor, said relationship of variation being known as the decreasing lithium hydroxide specification, these figures are.

DESCRIPTION OF THE PREFERRED EMBODIMENT

Figure 1:
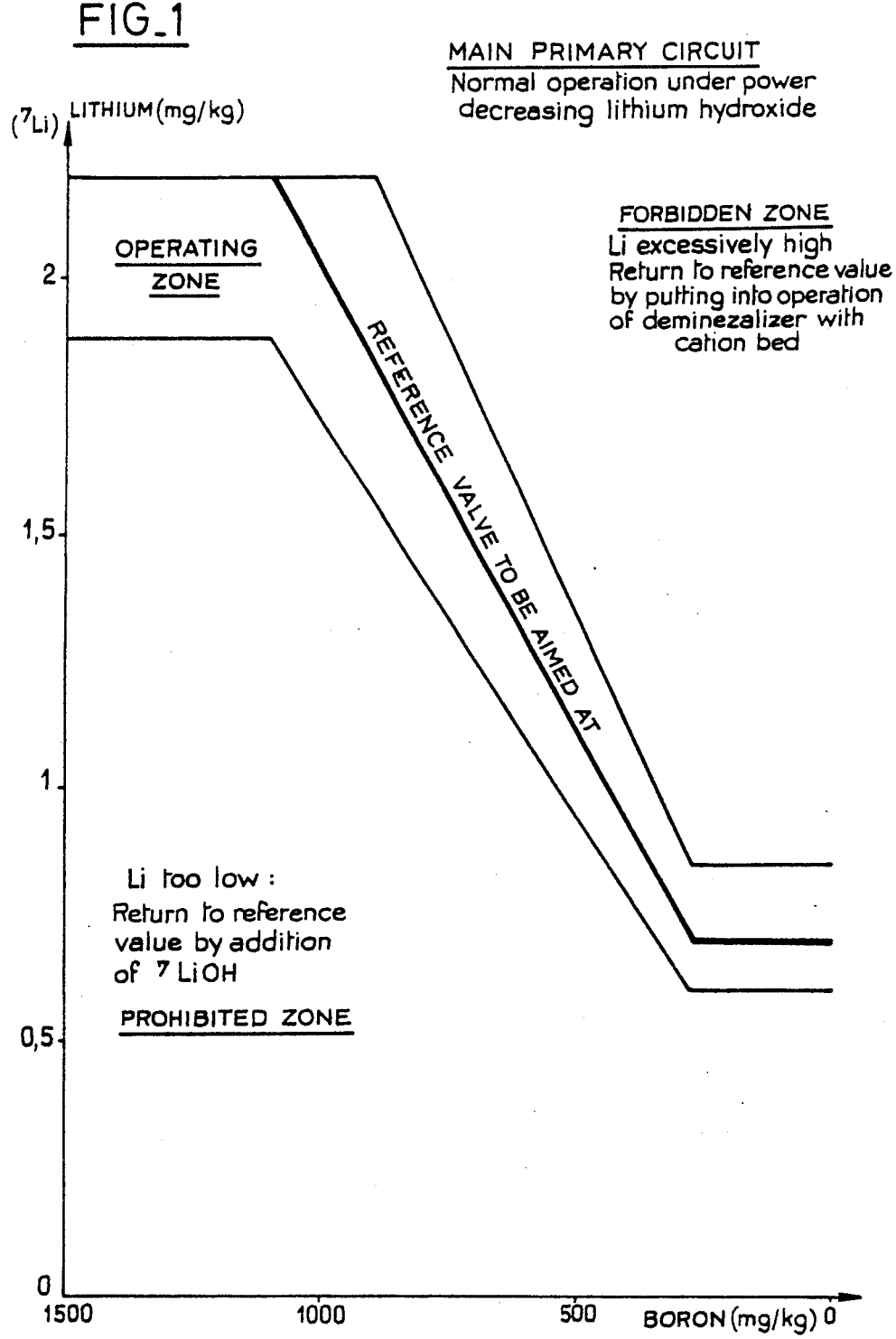
Figure 2:
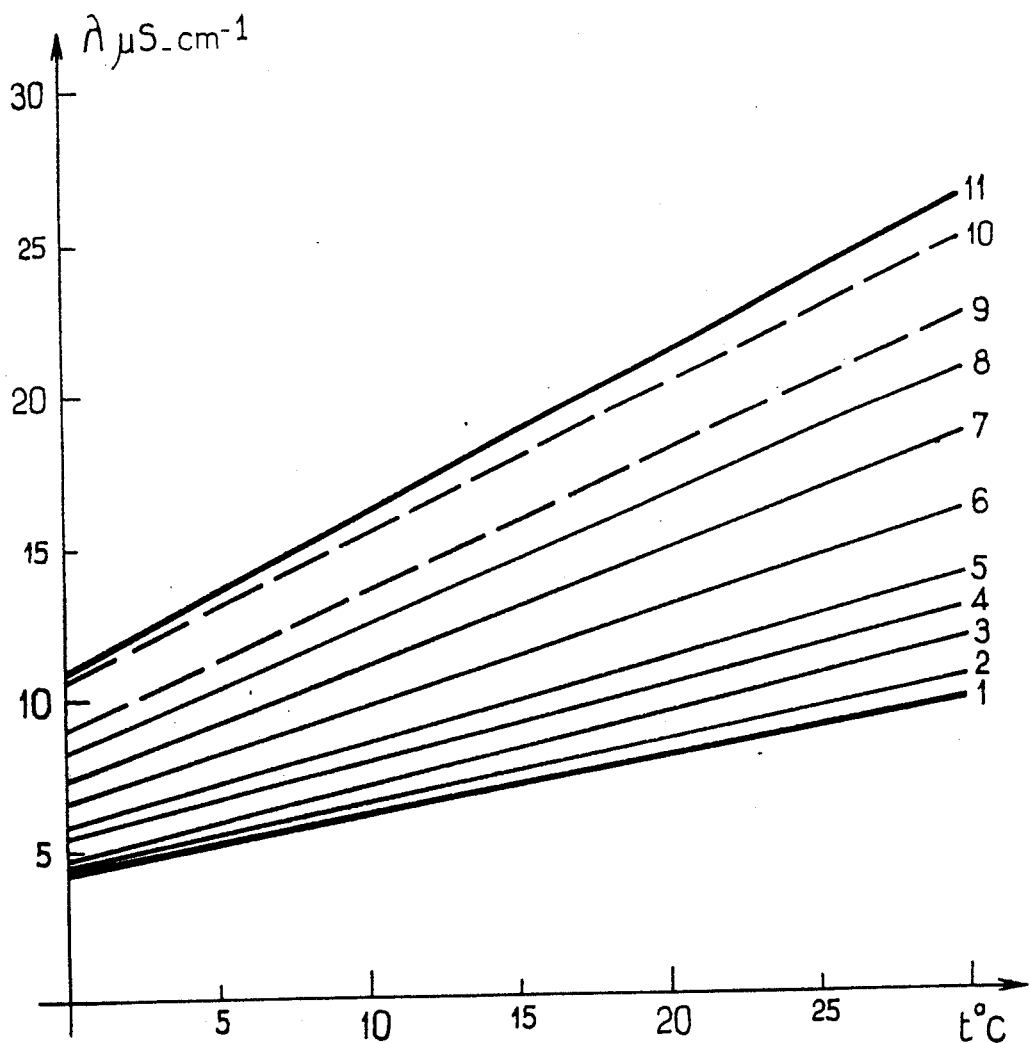
FIG. 2 which is a graph showing the variation in conductivity of the cooling water as a function of temperature for different concentrations of lithium and FIGS. 3 and 4 which are a block diagram of the device for measuring the lithium concentration.

The method according to the invention for measuring the lithium concentration in the primary cooling circuit of the pressurized-water reactor of a nuclear power station shall be described firstly with reference to FIGS. 1 and 2 in particular.

According to an especially advantageous feature of the method according to the invention, this method consists in measuring the electrical conductivity $\lambda$ of the cooling water of the primary circuit and in determining the lithium concentration by linear correlation between the above-mentioned electrical conductivity $\lambda$ and this concentration.

Thus the lithium concentration can be determined from a linear combination of electrical conductivity having the form:

$$[Li^+] = \alpha \cdot \lambda + \beta$$

In this relationship:

[Li$^+$]: represents the concentration in lithium ions, expressed in parts per million, α: represents a ratio coefficient without dimension;

β: represents a corrective term for the presence of impurities, if any, in the primary circuit cooling water.

The term β may be advantageously determined by the periodic ancillary measurement of the lithium concentration by atomic absorption spectrometry, for example.

The method of the invention, as described above, may of course be implemented, as a non-restrictive example, for a primary circuit where the cooling water has a temperature considered to be substantially constant. Of course the precision with which the parameter of electrical conductivity, for example, is measured is then affected, for experiments have shown that the electrical conductivity of the cooling water, or of a sample thereof, actually depends on the temperature.

During tests conducted for implementing the method according the invention, it has been shown that the electrical conductivity λ the cooling water is, in fact, a linear function of the temperature.

The conductivity λ(t) measured at a given temperature t of the above-mentioned cooling water verifies the relationship:

$$\lambda(25) = \lambda(t) + a \cdot [25 - t]$$

In this relationship,

λ(25): represents the conductivity of the cooling water at 25° C., and a: represents a coefficient that varies as a function of the lithium concentration.

t: represents the temperature parameter.

An experiment conducted to implement the method of the invention has established the variation of the electrical conductivity λ(t) as a function of temperature for several values of the pair comprising the boron concentration and the lithium concentration, as shown in FIG. 2. In the above-mentioned figure, the X-axis is graduated in degrees Celsius and the Y-axis is graduated in units of electrical conductivity, namely in micro-siemens per centimeter. In FIG. 2, the relationships governing the variation of the conductivity λ as a function of temperature t, corresponding to the different straight lines marked 1 to 11, each correspond to values of the pair formed by the lithium concentration [Li$^+$] and the boron concentration [B] corresponding to the values shown in the following table.

| 1. [Li$^+$] = 0,7 [B] = 5 a 200 | 6. [Li$^+$] = 1,3 [B] = 600 |
| 2. [Li$^+$] = 0,8 [B] = 320 | 7. [Li$^+$] = 1,48 [B] = 700 |
| 3. [Li$^+$] = 0,9 [B] = 380 | 8. [Li$^+$] = 1,66 [B] = 800 |
| 4. [Li$^+$] = 1 [B] = 430 | 9. [Li$^+$] = 1,84 [B] = 900 |
| 5. [Li$^+$] = 1,1 [B] = 490 | 10. [Li$^+$] = 2,02 [B] = 1000 |
|  | 11. [Li$^+$] = 2,2 [B] = 1100 a 1500 |

FIG. 2 thus makes it possible to establish the relationship governing the variation in electrical conductivity λ as a function of the temperature of the cooling water for temperature values t ranging between 5° C. and 30° C. and for lithium concentrations ranging between 0.7 and 2.2 ppm.

As can be easily seen in FIG. 2, the coefficient a, the slope of the straight line representing the relationship governing the variation in electrical conductivity as a function of temperature, varies as a function of the lithium concentration. As a matter of fact, it will be noted that for the lithium concentration values indicated in the above table, where the boron concentration values are also expressed in ppm corresponding to the values indicated, the coefficient a varies as a function of the lithium concentration according to a relationship with the form:

In view of the variation of the coefficient a according to the above-mentioned relationship, the method of the invention, according to a particularly advantageous and non-restrictive embodiment, thus consists in measuring the temperature of the cooling water in the primary circuit and in then determining a value close to the coefficient for a reference value of the lithium concentration marked [Li$^+$].

According to an advantageous aspect of the method according to the invention, the lithium concentration of the cooling water at the temperature t is then determined by the relationship:

$$[Li^+] = 0{,}1[\lambda(t) + (0{,}223\,[Li^+{}_r] + 0{,}03)(25 - t)] + \beta$$

The above-mentioned relationship can then be used to determine the lithium concentration of the cooling water of the primary circuit regardless of the temperature of this primary circuit in the normal temperature ranges of the sample of cooling water from the reactor and for boric acid concentrations of above 5 ppm and below 2500 ppm (expressed in terms of boron) in the cooling water.

Of course, in order to enable a totally optimal implementation of the method of the invention as described above, we shall describe below a mode of operation which can be used to determine the reference value of lithium concentration [Li$^+{}_r$] as a function of the boron concentration [B . Advantageously, the reference lithium concentration [Li$^+{}_r$] as a function of the boron concentration [B] is determined according to the above-mentioned specification known as the "decreasing lithium hydroxide" specification as shown in FIG. 1.

Advantageously, the reference lithium concentration [Li$_r{}^+$] then verifies the following relationshops (5) as a function of the boron concentration [B]:

$$[B] < 270 \text{ ppm } Li^+{}_r = 0{,}7 \text{ ppm}$$

$$270 \text{ ppm} < [B] < 1100 \text{ ppm } [Li^+{}_r] \, 1{,}8.10^{-3}\,[B] + 0{,}22$$

$$]B] > 1100 \text{ ppm } [Li_r] = 2{,}2 \text{ ppm}$$

The implementation of the method, as described above, using the above-mentioned lithium concentration reference values, makes it possible to maintain a pH value of the cooling water of the primary circuit at a value ranging between 6.5 and 7 at the operating temperature and, especially, at a nominal operating value corresponding to a pH of 6.83 at a nominal operating temperature of 286° C.

Of course, in view of the determining of the above-mentioned reference lithium concentration values [Li+], the lithium concentration values, calculated from the measured parameters of the electrical conductivity of the cooling water at the operating temperature t, of this operating temperature t, and from the effectively measured boron concentration values, are expressed according to the relationships (6), a, b, c, d below:

(a) $[B] = 0$
$[Li^+] = \gamma[\lambda(t) + a(25-t)] + \beta$; $0.05 < \gamma < 0.6$ et $0.1 < a < 0.4$
(b) $5$ ppm $< [B] < 270$ ppm
$[Li^+] = 0.1 [\lambda(t) + 0.1861 (25-t)] + \beta$
(c) $270$ ppm $< [B] < 1100$ ppm
$[Li^+] = 0.1 [\lambda(t) + (4.014 \cdot 10^{-4} \cdot [B] + 0.0791)(25-t)] + \beta$.
(d) $[B] > 1100$ ppm
$[Li^+] = 0.1 [\lambda(t) + 0.5206 (25-t)] + \beta$.

In the above-mentioned relationships, $\beta$ is of course the parameter that takes the impurities in the cooling water into account.

In the above-mentioned relationship 6a, i.e. for a boron concentration which is substantially zero, the lithium concentration [Li+] is given as a function of a ratio parameter $\gamma$ which ranges between 0.05 and 0.6, a boron concentration which is almost zero occurring substantially at the end of the production cycle, i.e. before the reloading of the reactor with fuel.

In the above-described method of the invention, the more the lithium concentration value [Li+] differs from the reference value, the less precise is the temperature correction. It is of course possible to reduce this fault in precision by performing an iteration on the computed value and to obtain the lithium concentration value [Li+] by successive approximations as described earlier.

A more precise description of a device to measure the lithium concentration in the primary cooling circuit of a pressurized-water reactor of a nuclear power station according to the earlier-described method of the invention shall now be given with reference to FIGS. 3 and 4.

As shown in FIG. 3, the device according to the invention advantageously comprises means 1 for measuring the electrical conductivity $\lambda(t)$ of the sample of cooling water from the primary circuit. In FIG. 3, the primary circuit is marked CP. Furthermore, the device of the invention has means 2 to measure the temperature of the cooling water of the primary circuit CP. Computing means 3 are provided in order to determine the lithium concentration [Li+] according to the above-described method of the invention. Furthermore, as shown in FIG. 3, the device of the invention comprises means 4 to measure the boron concentration of the cooling water.

FIG. 3 shows all the measuring means 1, 2 and 3 attached to a by-pass type circuit 103 which is parallel-connected to the primary circuit CP.

The means 1 for measuring electrical conductivity $\lambda(t)$ advantageously comprise a sensor 10 for measuring electrical conductivity, and the temperature-measuring means comprise a temperature probe 20. Similarly, the means 4 for measuring the boron concentration can advantageously consist of a boron counter.

As can be seen especially in FIG. 3, the means for measuring electrical conductivity and temperature and, in particular, the sensor 10 for measuring electrical conductivity and the temperature probe 20 are each installed in a pot 101 used to reduce the retention of radioactive deposits to the minimum. An advantageous embodiment of the pots 101, 102, in particular, will be given further below in the invention.

As is also shown in FIG. 3, the computing means 3 may advantageously consist of a computer. The computer has an interface 30 to link up all the measuring means such as the electrical conductivity measuring means 1, the means 2 for measuring the temperature of the cooling water and the boron concentration measuring means 4.

Advantageously, the interface 300 has means to sample and digitize the signals representing, respectively, electrical conductivity $\lambda(t)$, temperature t and boron concentration, said signals being delivered by each of the above-mentioned measuring means. Furthermore, a central processing unit and a memory unit 301 are provided, the interconnection between the central processing unit, the memory unit 301 and the interface 300 being done in a conventional way. Advantageously, the memory space of the memory unit 301 can be subdivided into a random-access memory, designed to receive the digitized and sampled values delivered by the interface 300, and a read-only memory in which is implanted a program to compute and determine the lithium concentration according to the above-described method of the invention.

According to a particularly advantageous arrangement of the device according to the invention, the lithium concentration computing and determining program, implanted in the memory space 301, may advantageously include an ancillary program or a sub-program used to determine the lithium concentration reference value [Li+] as a function of the boron concentration [B] according to the so-called decreasing lithium hydroxide specification. The lithium concentration reference value then verifies the above-described relationships (5) depending on the boron concentration [B]. Of course, the arrangement of the computing program as an ancillary program or a sub-program for determining the lithium concentration reference value is especially advantageous inasmuch as it makes the device according to the invention flexible in its use by the user or operator The said arrangement enables calling up or not calling up the above-mentioned ancillary program or sub-program as needed. It will be understood, of course, that the program for computing and determining the lithium concentration according the method of the invention can be arranged advantageously so as to perform a sequential reading of the means 1 for measuring the electrical conductivity $\lambda$ of the water, the temperature measuring means 2 and the boron concentration measuring means 4. In a non-restrictive way, the reading sequences of the above-mentioned means may be synchronous or asynchronous sequences depending on the installation and on its physical parameters For example, the sequences for reading the boron concentration, the temperature and the electrical conductivity of the cooling water may correspond, in a non-restrictive way, to a number equal to a reference period of a defined value or to a multiple of this number. The above-mentioned flexibility of the computing programs, achieved in this way, provides, in particular, for optimizing the response time of the entire cooling circuit when correponding quantities of lithium hydroxide are introduced into the primary circuit to ensure regulation of the pH of the cooling water through the application of the method of the invention and by means of the device described in FIG. 3.

Of course, the optimizing of above-mentioned response time is achieved depending on the boron concentrations measured, namely at the instant of operation of the nuclear reactor in the period constituted by its production cycle, i.e. between two reloadings of fuel. Of course, the corresponding lithium concentrations are determined according to the relationships indicated in 6 a, b, c, d.

Advantageously, the computer 30 may consist of a microcomputer, for example, provided with peripherals such as a keyboard 31 and a display screen 32. In this case, the above-mentioned computing program may advantageously consist of a "menu" type program enabling a user to determine certain operating parameters of the device. In particular, when the temperature of the sample of water from the primary cooling circuit can be considered to be substantially constant, it is not necessary to apply the sub-program for determining the boron concentration.

Of course the value of the lithium concentration [$Li^+$] can then be directly displayed on the display screen 32 in a conventional way. According to another particularly advantageous feature of the device according to the invention, the interface board 300 may also comprise an analog output 3001 of a conventional digital/analog conversion board interconnected with the interface board 300, the above-mentioned output 3001 being used to deliver an analog signal which may consist of a signal that is variable in current between 4 and 20 milliamperes, said signal can then be used to concentration. This analog signal can then be used to control and regulate the opening of a valve to introduce lithium hydroxide into the primary cooling circuit CP to achieve automatic regulation of the pH of the cooling water.

Indications pertaining to a practical embodiment of the device according to the invention shown in FIG. 3 will now be given with particular reference to FIG. 4. The means 1 for measuring the electrical conductivity of the cooling water may advantageously comprise an industrial type of sensor which gives continuous information. The above-mentioned measuring sensor may, for example, correspond to the specifications of the conductivity sensor marketed under the modified reference 5305 by the firm POLYMETRON-SIEGLER in France.

The temperature probe 20 may also consist of a temperature probe of the PT 100 JUMO type marketed by the same firm. The sampling and digitizing circuits of the signals given by the the above-mentioned measuring means may advantageously correspond, as regards the measurement of conductivity, to the specifications of the 8278 type industrial conductimeter marketed by the same firm and, as regards the measurement of temperature, to the specifications of the 8282 type universal measuring converter marketed by the same firm.

The boron concentration is measured by a boron counter working on the principle of measurement by absorption of neutrons The sampling circuits that receive the signal representing the boron concentration, delivered by the boron counter, may advantageously correspond to the specification of the model 8277 converter marketed by this same firm.

In the same way, the digital/analog conversion board, which gives the lithium concentration analog output signal at the output 3001 of the interface 300 may correspond to the specifications of the voltage/current converter 8271 marketed by the same firm.

In addition, the above-mentioned "menu" program may advantageously be arranged so that the measurement values for the calibration of the device with respect to the lithium concentration, the measurement being done by atomic absorption, are taken into account by the computing program, it being possible for the operator to introduce these values on being led to do so by the "menu" program.

As indicated previously, the temperature measuring probe 20 and the electrical conductivity measuring probe 10 are each submerged in a measuring pot 102, 101 respectively The measuring pots 101 and 102 have, in particular, a geometry which can minimize the retention of any radioactive deposits.

As shown in FIG. 4, the measuring pots 101 and 102 are, in particular, cascade-connected by means of the bypass circuit 103, and the arrows show the direction in which the cooling water flows. The pots 101 and 102 consist of substantially cylindrical hollow elements, each pot comprising an inlet regulating nozzle 1020 and an outlet regulating nozzle 1010, respectively connected to the bypass conduit 103. The pot 101 receives the electrical conductivity measuring probe, represented by 1011, and the pot 102 receives the temperature measuring probe marked 1021. The pots 101 and 102 and the bypass conduit 103 are made of a material such as, for example, high-quality stainless steel. They have a minimum volume that can cause the retention of the radioactive particles resulting from corrosion.

We have thus described a method and device for the continuous measurement of the lithium concentration in the primary cooling circuit of the pressurized-water reactor of a nuclear station, a method and device that are particularly advantageous inasmuch as the above-mentioned continuous measurement enables the efficient regulation of the pH of the cooling water at a pre-determined value. This regulation especially enables an optimization of the response time of the cooling circuits to maintain the pH at the desired value, the effect of which is to reduce radiation undergone by personnel working on the circuits.

Furthermore the injection of the exact quantities of lithium hydroxide needed in the primary circuit CP enables not only the optimizing of the response time of the primary circuits CP to maintain a constant pH of the cooling water but also to economize on lithium hydroxide consumption for the lithium used, which is isotopically enriched with lithium 7 is expensive.

Furthermore, the method and device of the invention reduce human intervention in the above-mentioned cooling circuits to the minimum.

What is claimed is:

1. A method for measuring and controlling the lithium concentration in the primary cooling circuit of the pressurized-water reactor of a nuclear power station, wherein said method comprises:
measuring the electrical conductivity $\lambda$ of the cooling water, or a sample thereof, of said primary circuit,
measuring the temperature of the cooling water to define a given temperature (t);
converting said measured values obtained for said electrical conductivity $\lambda$ and said given temperature (t) into signals and inputting the signals into a computer;

utilizing said computer to determine from the conductivity and temperature signals a value [Li+] for the lithium concentration by linear correlation between said electrical conductivity λ of the cooling water and this concentration;

said lithium concentration being determined from a linear combination of the electrical conductivity having the form:

$$[Li^+] = \alpha \cdot \lambda + \beta$$

a relationship wherein:

[Li+]: represents the concentration in lithium ions, expressed in parts per million, α: represents a ratio coefficient;

β: represents a corrective term for the presence of impurities, if any, in the primary circuit cooling water, the term β being determined by the periodic ancillary measurement of the lithium concentration by atomic absorption spectrometry;

said electrical conductivity λ of the cooling water being a linear function of the temperature;

the electrical conductivity λ(t) measured at a given temperature t, having the relationship:

$$\lambda(25) = \lambda(t) + a \cdot [25 - t]$$

a relationship in which,

λ(25): represents the conductivity of the cooling water at 25° C., a: represents a coefficient that varies as a function of the lithium concentration; and utilizing the computed lithium concentration [Li+] value to regulate the lithium concentration and pH value of the cooling water of the primary circuit of a nuclear power station reactor.

2. Use of the method according to claim 1 to regulate and maintain the lithium concentration and pH value of the cooling water of the primary circuit of a nuclear power station reactor at a given value.

3. A method according to claim 1 wherein, with the coefficient a varying as a function of the lithium concentration according to a relationship having the form:

$$a = 0.223 [Li^+] 0.03,$$

said method comprises:

determining a value close to for a lithium concentration reference value marked [Li+], the lithium concentration of the cooling water at the temperature t being determined by the relationship:

$$[Li^+] = 0.1[\lambda(t) + (0.223 [Li^+_r] + 0.03)(25 - t) + \beta$$

4. A method according to claim 3 wherein the lithium concentration [Li+] is determined by iteration on the computed value to obtain a concentration value Li+ by successive approximations.

5. A device to measure the concentration of lithium in the primary cooling circuit of the pressurized-water reactor of a nuclear power station, said device comprising:

means to measure the conductivity λ(t) of the cooling water of said primary circuit, means to measure the temperature of the cooling water of said primary circuit, means to compute the lithium concentration [Li+] according to claim 1.

6. A device according to claim 5 further comprising means to measure the boron concentration.

7. Use of the device according to claim 5 to regulate and maintain the lithium concentration and pH value of the cooling water of the primary circuit of a nuclear power station reactor at a given value.

8. A device according to claim 5 wherein said means to measure the electrical conductivity comprises a sensor to measure electrical conductivity.

9. A device according to claim 8 wherein said means for measuring electrical conductivity and temperature are each installed in a pot which makes it possible to reduce the retention of the radioactive deposits to the minimum.

10. A device according to claim 5 wherein said means to measure the temperature comprises a temperature probe 20.

11. A device according to claim 10 wherein said means for measuring electrical conductivity and temperature are each installed in a pot which makes it possible to reduce the retention of the radioactive deposits to the minimum.

12. A device according to claim 6 wherein said computing means consist of a computer comprising:

an interface for the connection of all the said measuring means, said interface comprising means for the sampling and digitization of the signals respectively representing electrical conductivity, temperature and boron concentration, a memory unit in which is implanted a program to compute and determine the lithium concentration.

13. A device according to claim 12 wherein said computing program comprises an ancillary program or a sub-program used to determine the lithium concentration reference value [Li+$_r$] as a function of the boron concentration [B] according to a so-called "decreasing lithium hydroxide" specification., said lithium concentration reference value [Li+$_r$] verifying, according to the boron concentration [B], the relationships:

$$5 \text{ ppm} < [B] < 270 \text{ ppm } [Li^+_r] = 0.7 \text{ ppm}$$

$$270 \text{ ppm} < [B] < 1100 \text{ ppm}$$
$$[Li^+_r] = 1.8 \cdot 10^{-3}[B] + 0.22$$

$$[B] > 1100 \text{ ppm } [Li_r] = 2.2 \text{ ppm}$$

for a pH of the cooling water kept at a value ranging between 6.5 and 7.0.

14. A device according to claim 13 wherein said program for computing the lithium concentration [Li+], as a function of the measurement parameters of the temperature t, the electrical conductivity λ(t) of the cooling water and its boron concentration [B], is used to determine, as a function of said boron concentration, the lithium concentrations [Li+] according to the relationships:

(a) $|B| = 0$
$|Li^+| = \gamma[\lambda(t) + a(25-t)] + \beta$ (b) $5 \text{ ppm} < |B| < 270 \text{ ppm}$
$[Li^+] = 0.1 [\lambda(t) + 0.1861 (25-t)] + \beta$ (c) $270 \text{ ppm} < [B] < 1100 \text{ ppm}$
$[Li^+] = 0.1 [\lambda(t) + (4.014 \cdot 10^{-4} \cdot [B] + 0.0791)(25-t)] + \beta$ (d) $|B| > 1100 \text{ ppm}$
$[Li^+] = 0.1 [\lambda(t) + 0.5206 (25-t)] + \beta$ relationships wherein β is a parameter that takes into account impurities in the cooling water.

* * * * *